United States Patent
Allen, Jr.

[11] 3,773,308
[45] Nov. 20, 1973

[54] GAS QUENCHER-SCRUBBER AND WATER SEAL APPARATUS FOR HOT PARTICLE-LADEN GAS SOURCES

[75] Inventor: Walter R. Allen, Jr., Ringoes, N.J.
[73] Assignee: Research-Cottrell, Inc., Bridgewater Township, N.J.
[22] Filed: June 26, 1972
[21] Appl. No.: 266,257

[52] U.S. Cl............... 266/15, 55/220, 55/228, 55/257, 55/355, 55/419, 261/17, 261/115
[51] Int. Cl............................................ B01d 47/06
[58] Field of Search........... 55/93–95, 72, 220, 228, 55/244, 255, 256, 257, 55/355, 419; 261/119, 17, 115–118, DIG. 9; 266/15, 24, 31

[56] References Cited
UNITED STATES PATENTS
| | | | |
|---|---|---|---|
| 836,826 | 11/1906 | Pettit | 261/119 R |
| 2,778,442 | 1/1957 | Jenkins et al. | 261/DIG. 9 |
| 3,179,387 | 4/1965 | Umbricht | 261/DIG. 9 |

FOREIGN PATENTS OR APPLICATIONS
| | | | |
|---|---|---|---|
| 962,783 | 4/1957 | Germany | 55/223 |
| 627,057 | 2/1963 | Belgium | 55/256 |

*Primary Examiner*—Bernard Nozick
*Attorney*—Harold L. Stowell et al.

[57] ABSTRACT

In a twin foundry furnace cupola arrangement, as an exemplary environment, a cylindrical, vertically oriented, quencher having generally a conical floor is divided into two sections by a diametrical baffle upstanding from the floor to a point about half the height of the quencher and to the bottom of a horizontal gas outlet located in the side of the quencher, each section formed by the diametrical baffle having an inlet for gases from its associated cupola and being segmented by a vertical baffle that extends downwardly therein to a point adjacent to and spaced from the floor and below the top of the diametrical baffle. Each section has overhead spray nozzles to spray water down onto the baffles and onto the gases and each section has its own floor drain.

With one cupola shut down, the quencher section therefor has its drain closed and it is filled with water up to the level of the gas outlet and above the bottom of the downwardly extending baffle so as to seal off the gas passage to such cupola. Hot particle-laden gases from the functioning cupola enter its quencher section to be saturated with water, drawn down under the baffle and through the restrictive passage between the baffle and the floor, and then drawn upwardly in turbulence to the gas outlet so that the temperature of the gas is lowered and larger particles are separated out therefrom to be carried with the spray water out the open floor drain. The scrubbed and cooled gases pass from the quencher through the outlet via conduit means to, preferably, a fine particle scrubber, to a mist eliminator and, thence out a chimney under the draft of a fan. The particle-laden water flows to a separation tank and then the water is recirculated.

7 Claims, 7 Drawing Figures

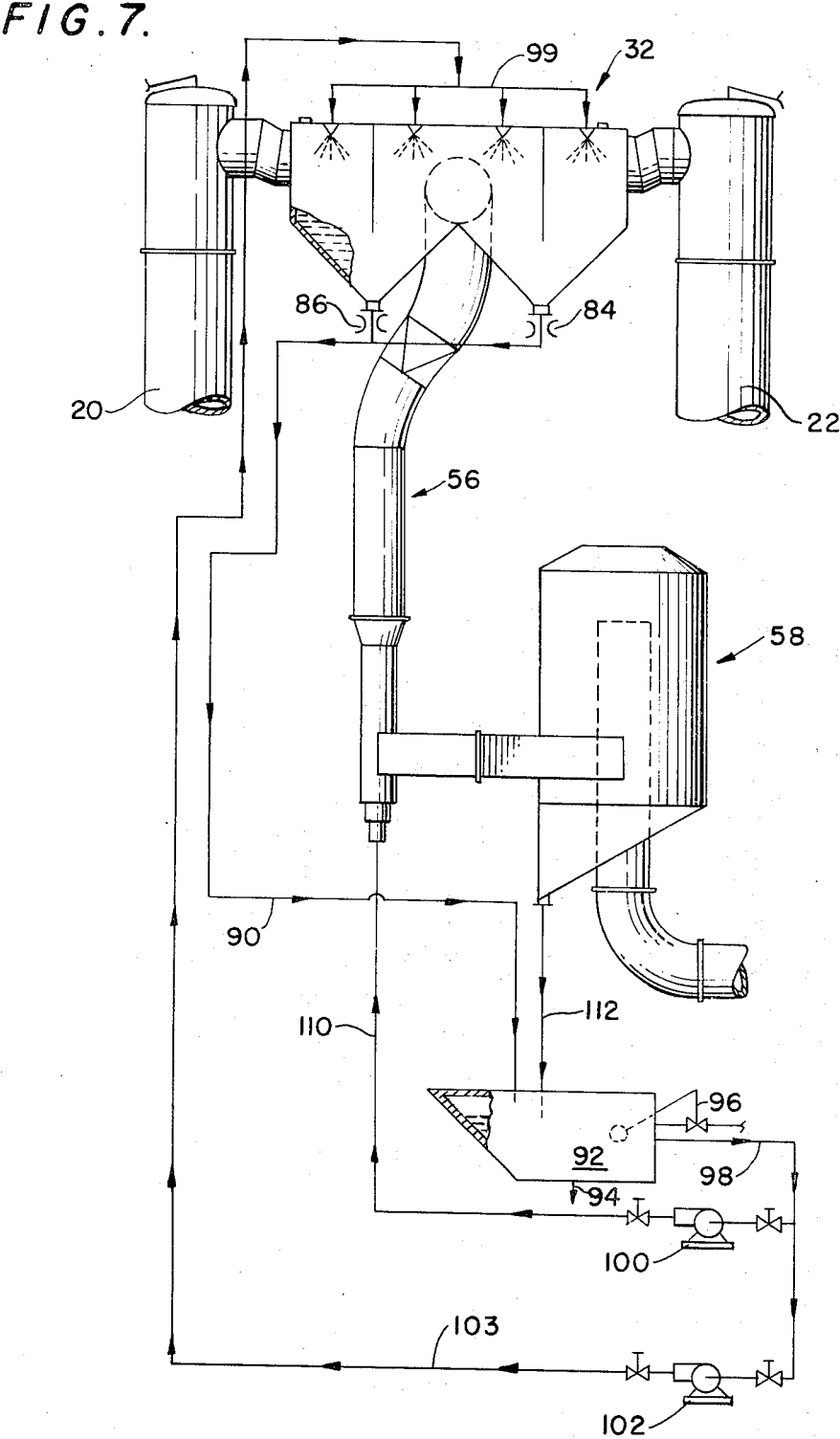

3,773,308

GAS QUENCHER-SCRUBBER AND WATER SEAL APPARATUS FOR HOT PARTICLE-LADEN GAS SOURCES

BACKGROUND OF THE INVENTION

1. Field of the Invention

The present invention generally appertains to new and novel improvements in systems and apparatus for the scrubbing of hot, particle-laden gases, which result from various industrial processes, and is especially directed to a new and novel quench and scrubber system and apparatus for quenching and scrubbing with liquid hot particle-laden gases, such as those discharged from a foundry furnace cupola.

2. Description of the Prior Art

There are many and varied prior art disclosures relating to apparatus and methods for quenching or scrubbing a hot gas stream that is emitted from a furnace or other gas source by spraying the gas stream with water or similar liquid, while, at the same time, affecting in some way the flow direction or speed of the gas stream. In such way, the temperature of the gases is lowered and coarse solids are separated to some extent from the cooled gases.

Some prior art devices are simple in structure and are in the nature of mechanical collectors, while others are greatly refined and are in the nature of high energy scrubbers. None of the prior art devices are capable of receiving hot, particle-laden gases from a plurality of sources and then capable of closing off one source for reconditioning of the furnace for example, while the source of gases is open and the gases treated.

SUMMARY OF THE INVENTION

In accordance with the present invention, a gas quencher and scrubbing apparatus is provided for use in operative association with a plurality of furnace cupolas or other sources of hot, particle-laden gases.

Such apparatus essentially comprises a closed container or quencher that is connected to the tops of two standard vertical furnace cupolas by separate conduit means. The quencher is provided with generally a center vertical baffle which extends from the bottom of the quencher to a point about half the height of the quencher and to the bottom edge of a gas outlet opening dividing the quencher generally into two sections. Each section has liquid spraying devices and a bottom drain to lower the temperature of the discharge gases from the foundry furnace cupola and separates larger particles out of the gas streams.

When the hot gases enter either of the quencher sections they pass downwardly under a baffle which extends from the top of the quencher to a point adjacent the bottom and below the top edge of the center baffle. The gas then turns upwardly and exits through the gas outlet opening.

The cooled and scrubbed gases then pass through a conduit, preferrably, to a scrubber, such as a flooded disc scrubber, to a mist eliminator and, thence, through a conduit out a chimney under the draft of a fan means.

The quencher has a three-fold purpose, namely, (1) to quench or lower the temperature of the very hot discharge gases from a plurality of cupolas; (2) to separate a large portion of the particles from the gas stream; and (3) to provide a water seal damper to either one of two gas sources so that one cupola can operate while another is shut down.

The quencher is constructed so that a water seal closes off the gas passageway to the non-operating cupola by raising the water level above the bottom of the downwardly directed baffle while another portion of the quencher receives gases from the operating cupola. The water seal prevents drawing air through the shut down cupola and prevents any backflow of hot gases into the shutdown cupola.

By its cylindrical shape, the quencher allows entry of inlet ducts from several angles, having regard to two or more cupolas in the midst of which it is placed. This is important because the location of the quencher will be controlled by the floor space below and the spacing of the cupolas. Such cylindrical shape allows for greater strength, less carbon steel stiffeners and a significant savings in fabrication material, such as stainless steel.

It is another important object of the present invention to provide an improved gas scrubbing system that can serve two or more hot gas sources, such as two or more cupolas in a foundry furnace.

A further important object of the present invention is to provide a quencher that can effectively quench a hot particle-laden gas stream while acting as a low energy scrubber.

A further important object of the present invention is to provide a quencher that can function with two or more gas sources by providing a water seal damper to one source and as a low energy scrubber to the other source.

A still further important object of the present invention is to provide a quencher that is externally shaped and internally formed so that it can be built sturdily but extremely inexpensively and so that it can be located with a high degree of flexibility in a system and with respect to multiple sources of hot dirty gases and so that it can effectively quench and scrub hot particle-laden gases from one source while providing a water seal damper for another source.

BRIEF DESCRIPTION OF THE DRAWINGS

FIG. 7 is a diagramatic view of the preferred form of water recirculation system of this invention.

DESCRIPTION OF THE PREFERRED EMBODIMENT

Figure 1:
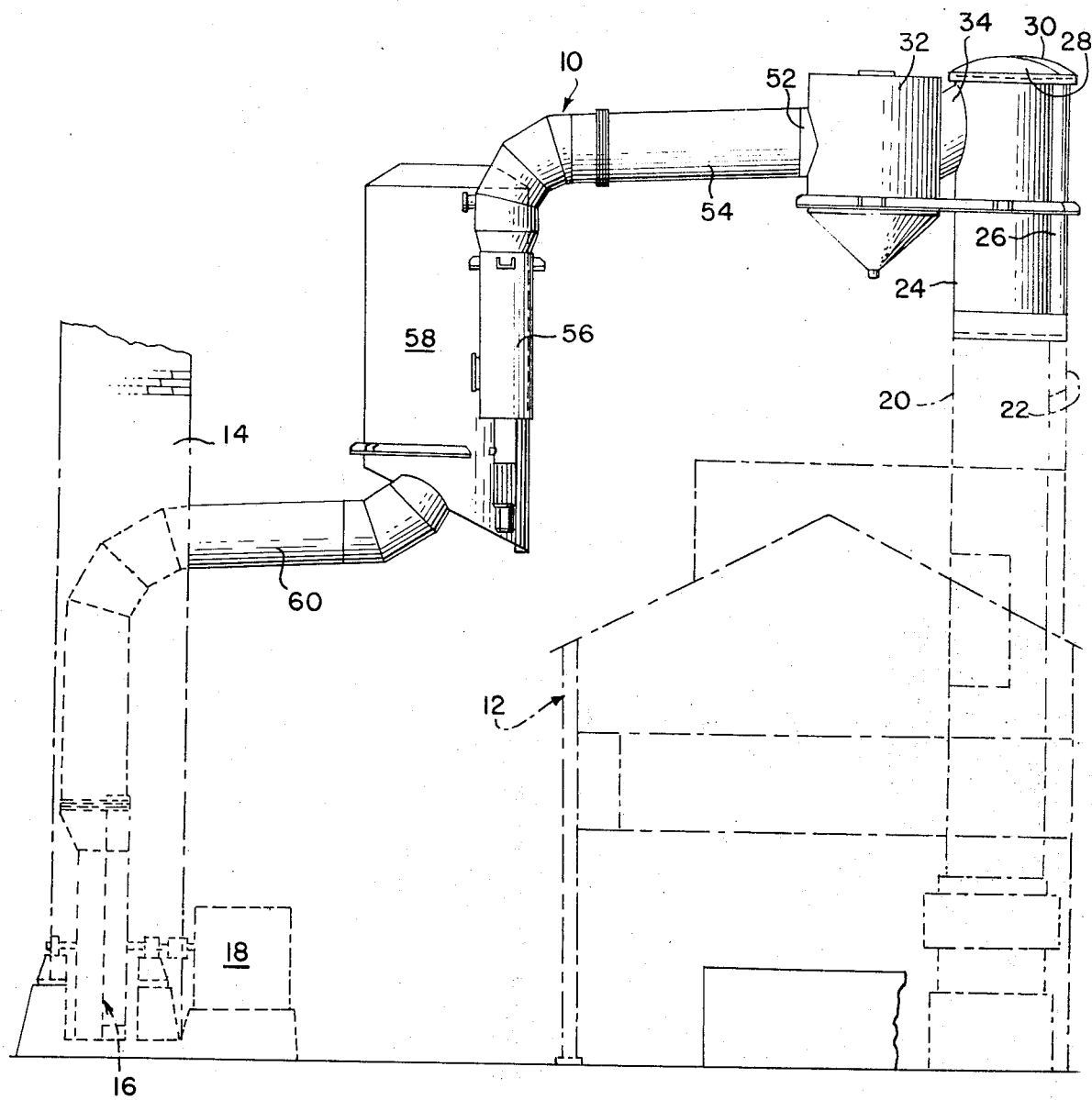
FIG. 1 is a side elevational view of the gas quencher-scrubber apparatus of the present invention together with other gas cleaning apparatus connected to a twin cupola foundry furnace.
Figure 2:
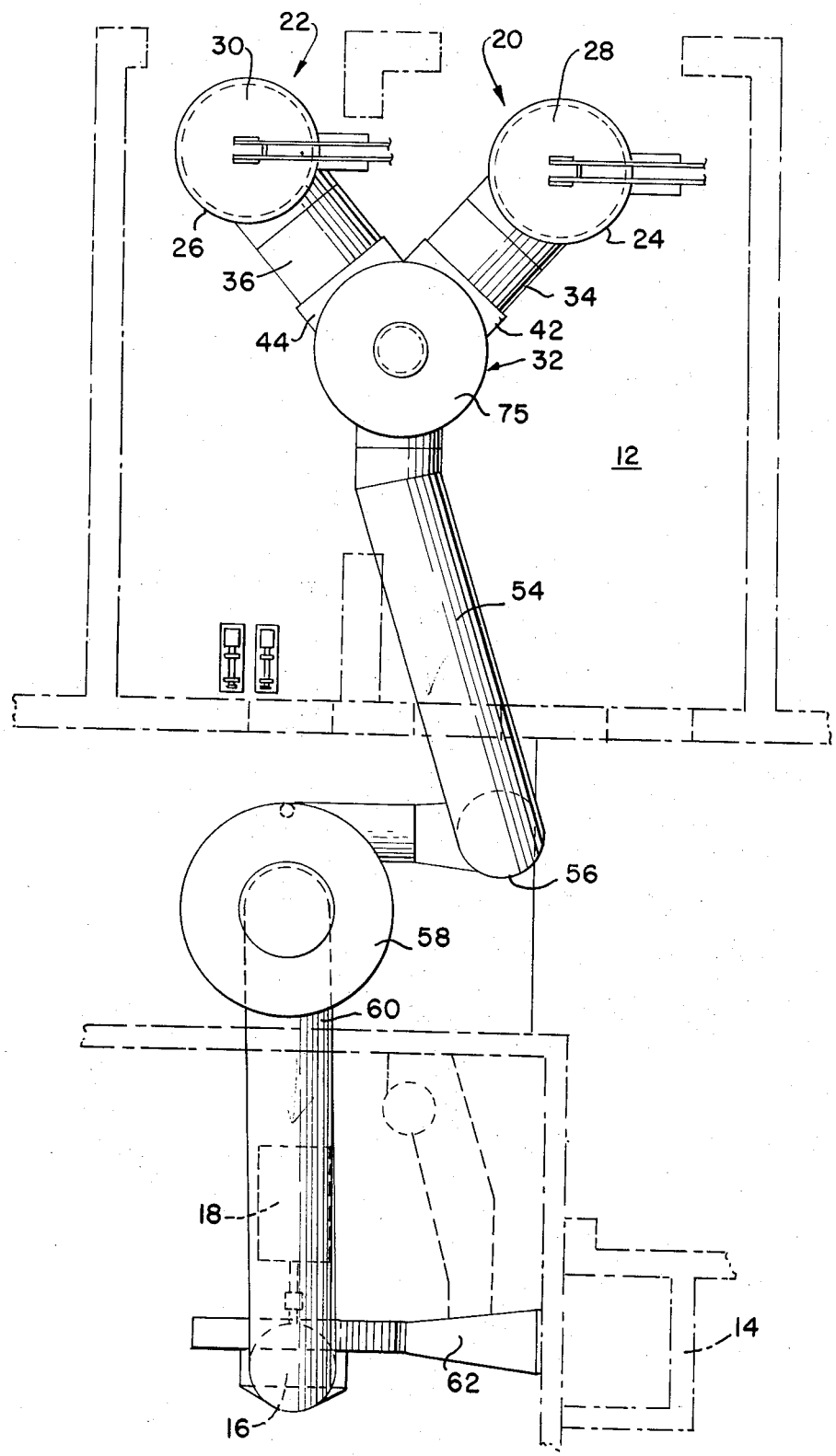
FIG. 2 is a top view of the apparatus shown in FIG. 1.

Referring now more particularly to the accompanying drawings, and initially to FIGS. 1 and 2, the preferred embodiment of the invention includes the preferred form of the quencher-scrubbing apparatus 32 of this invention connected, on the right, to two furnace cupolas 20 and 22 (cupolas 22 being behind cupola 20) and, on the other side, to additional gas cleaning apparatus including a high energy scrubber 56, a mist eliminator 58, and a chimney 14. The hot particle-laden gases emitted from the furnaces 20, 22 located in the foundry 12 are quenched and scrubbed by the air cleaning system before being passed out chimney 14 under the draft of a fan unit 16 having a drive motor 18.

The standard vertical cupolas 20, 22 are provided with top cylindrical extension caps 24, 26 having hinged doors 28, 30. The caps permit the quencher to be connected to the cupolas and provide a top bypass door in case an emergency condition results.

Figure 3:
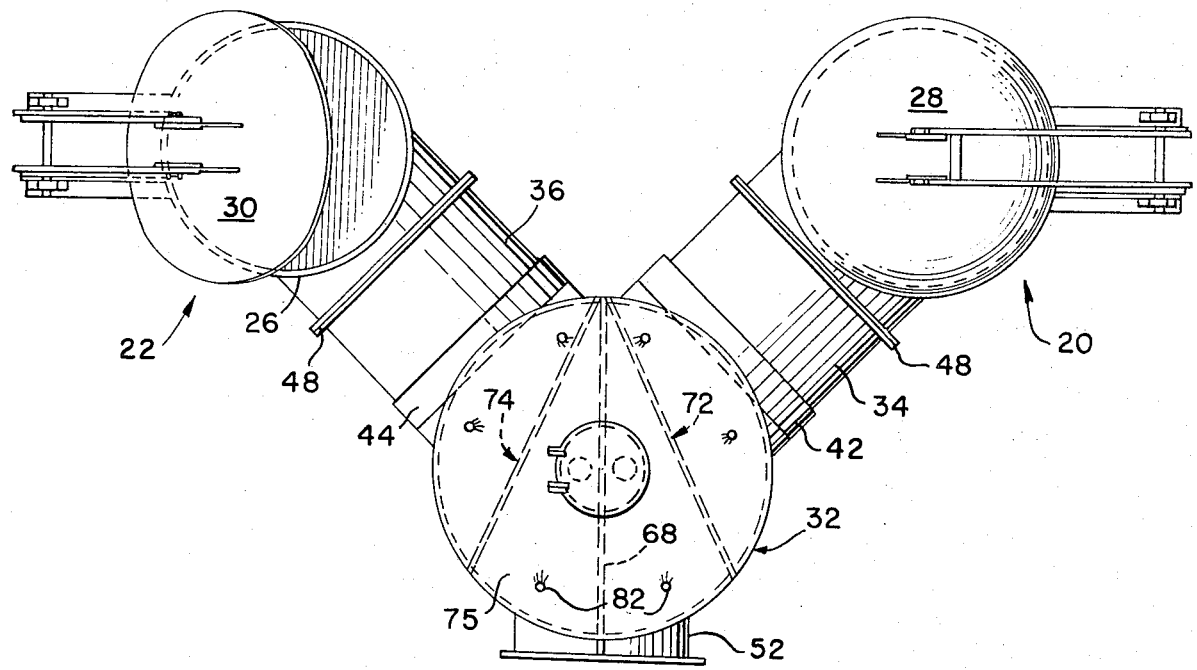
FIG. 3 is an enlarged top view of the quencher with some internal structure shown in broken lines.
Figure 4:
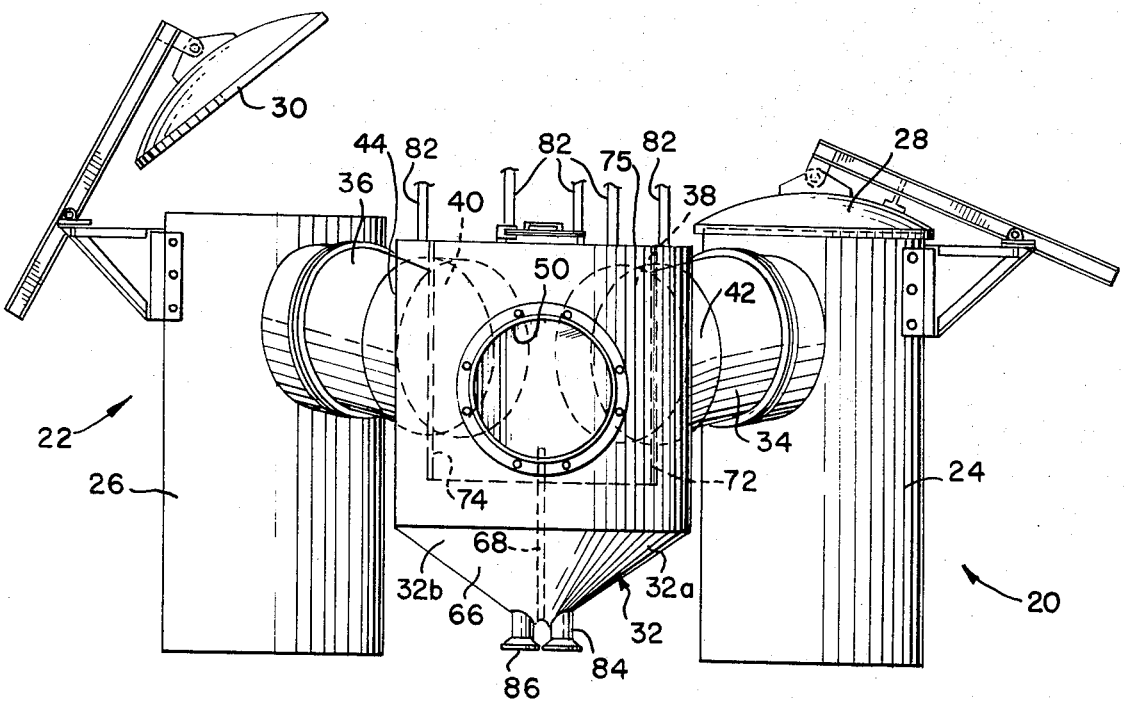
FIG. 4 is a front elevational view of the quencher and cupolas shown in FIG. 3 with some internal structure shown in broken lines.

The cupolas are connected to the quencher 32 by short ducts 34 and 36, which are preferably refractory lined. The quencher 32, which is shown more particularly in FIGS. 3–6 and which will be more specifically described hereinafter, is preferably of a cylindrical or round geometrical shape and, in the illustrated instance of the twin cupolas 20 and 22, the circular side wall of the quencher body is provided with a pair of angularly spaced apart, radial inlet openings 38 and 40, as shown in FIG. 4. The inlet openings 38, 40 are adjacent the top of the side wall of the quencher. Annular collars 42, 44 radially project from the side of the quencher around the inlet openings 38, 40 and receive the outer ends of the cupola connecting ducts 34 and 36. As shown in FIG. 3, the short ducts 34, 36 are connected to and extend from the cylindrical caps 24, 26 of the cupolas and have suitable joining surfaces 48, which may be of an expansion character.

As can be appreciated from a consideration of FIGS. 2 and 3, the quencher 32 may be positioned between the cupolas and very close to the top caps 24, 26.

A gas outlet opening 50 is located in the side wall of the quencher as shown best in FIG. 4. Opening 50 is positioned angularly away from the two inlet openings 38, 40 and the height of opening 50 is generally in the upper portion of quencher 32 but slightly below the height of the inlet openings 38, 40. This is to prevent water from flowing into the inlet openings and then into the cupolas.

A fitting collar 52 projects from outlet 50 for connection to a conduit 54, as shown in FIGS. 1 and 4. Conduit 54 connects the quencher 32 to a flooded disc scrubber 56 and hence to a mist eliminator 58. A similar conduit 60 connects the mist eliminator 58 to the intake side of the fan 16 which has its output side connected by a duct 62 to the lower end of the chimney 14, as shown in FIGS. 1 and 2.

Referring now more particularly to FIGS. 3–6, the quencher 32 is a closed container preferably of a cylindrical configuration, with angularly spaced-apart inlet openings 38, 40 and an outlet opening 50, all located generally near the top of the container in the side wall. The diameter of the inlet openings are preferably the same size and preferrably larger than the diameter of the outlet opening 50.

The bottom 66 of the quencher 32 is generally conical in shape until it reaches the apex where it divides and each apex has a valve control drain 84, 86 which drain water from separate sections created by an internal baffle 68.

Figure 5:
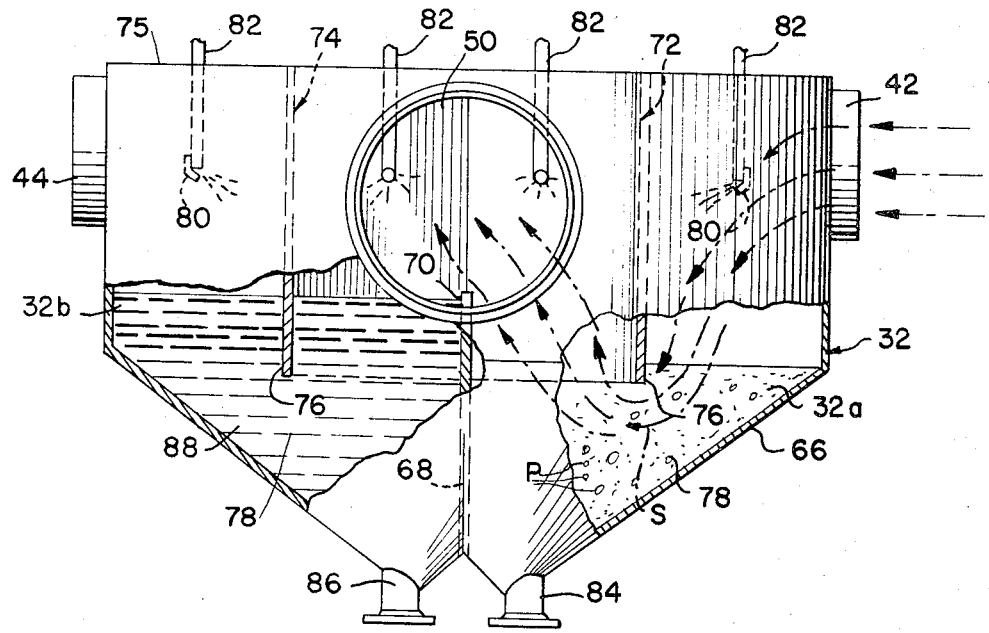
FIG. 5 is generally an elevational view of the quencher, partly in section and cut away, showing the operation of the apparatus with the first of the two cupolas non-functioning.
Figure 6:
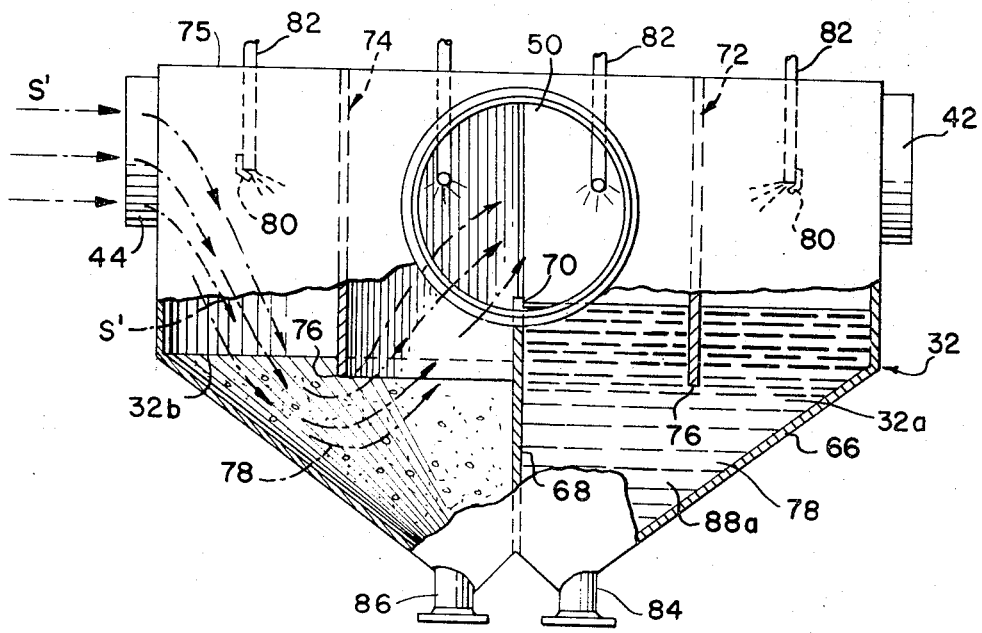
FIG. 6 is a view similar to FIG. 5 but showing the operation of the apparatus with the second of the two cupolas in non-functioning condition.

The interior of the quencher may be considered as being divided into two sections 32a and 32b, shown best in FIGS. 5 and 6, by a diametrically disposed center baffle 68 which extends upwardly from the bottom 66 between the drains 84, 86 to a point about half the height of the quencher and so that its upper edge 70 lies slightly above the bottom level of the outlet 50. Baffle 68 extends across the quencher from opposing sides between the two inlet openings 38, 40.

Two additional baffles 72, 74 are located within the quencher to further segment the interior. The quencher section 32a is partially segmented by vertical baffle 72 shown in FIGS. 3–6, and, similarly, the quencher section 32b is segmented by a similar baffle 74. The baffles 72 and 74 descend from the top 75 of the quencher to a point adjacent to and spaced above the sloping underlying bottom 66, with the lower edges 76 of the baffles defining with the confronting sloping bottom 66 restrictive passages 78 for the flowing gas streams. The lower edges 76 of the baffles 72, 74 are at the same height above the bottom 66 and are disposed well below the upper edge 70 of the center dividing baffle 68, as shown in FIGS. 5 and 6. Baffles 72, 74 are arranged in divergent, vertical planes with respect to outlet 50 and baffle 68, and fan out from one side edge of the baffle 68. Baffles 72, 74 extend across from generally opposing side walls and form a barrier between each inlet opening and the outlet opening as shown in FIG. 3.

Six overhead water spray nozzles 80, as shown in FIGS. 5 and 6, are located within and adjacent to the top of the quencher and are connected to pipes 82 that pass vertically through the top 75 of the quencher from exterior headers shown diagramatically in FIG. 7. Two nozzles are located between each baffle 80 and its respective inlet opening 38, 40 and a pair of nozzles are located on either side of the center baffle 68. The spray nozzles are located within the quencher to direct water into the gas streams and against the baffles to prevent caking of particles on the baffles. Spraying water under pressure into the incoming dirty gases atomizes the water and saturate the gas causing the larger entrained particles to become thoroughly wetted, held in the water droplets and then separated out of the gas stream to fall into the water running down the insides of the quencher and baffles. The water then passes out the valve controlled drains 84, 86 to the separation tank and recirculation system. Additional spray nozzles 80 may be provided in the quencher if desired. The water is continuously sprayed into the quencher while either or both cupolas are in operation and hot gases are passing through the quencher.

The preferred form of the apparatus of this invention operates substantially as follows.

Referring to FIGS. 1, 3 and 6, it is assumed that the left hand cupola 22 of FIG. 3 is shut down with the top 28 open for normal relining or similar purposes while cupola 20 is in operation. Drain 86 for the quencher section 32b is closed. Spray nozzles in sections 32a and 32b are operated continuously for two reasons: (1) to fill and maintain the section 32b with a body 88 (FIG. 5) of water that serves as a water seal damper for the non-functioning cupola 22, and (2) to quench hot particle-laden gases in section 32a. The water is allowed to rise to the level of the outlet 50, as shown in FIG. 5, so that at such height it has an 8-inch head above the bottom edge 76 of the baffle 74 and all overflow water from the filled chamber will pass through conduit 54, FIG. 2. The overflow water keeps conduit 54 rinsed and it provides additional water to the high energy scrubber 56. The body 88 of water effectively prevents the fan 16 from pulling air from the non-functioning cupola 22 into the quencher through the connecting duct 36 and prevents a back flow of gas from cupola 20.

As the gas stream from cupola 20 flows into quencher section 32a, drain 84 is open and water from nozzles 80 spray into the gas stream as indicated by the arrows S in FIG. 5. These gases are very hot, in the temperature range of 1,400° to 1,600° E., when they enter the quencher. The water sprays immediately begin to lower its temperature as the gas is first deflected downwardly to pass beneath the baffle 72, and through the restrictive passage 78 and then turned upwardly to the outlet 50. The passageway 78 causes the gas stream to decelerate momentarily and some turbulence and an area of reduced pressure occurs mixing the water intimately with the gas stream. The gases are saturated with water from the spray nozzles 80 located on both sides of the baffle 72. These actions, together with the abrupt change in direction, cause the larger particles to separate out of the gas stream and be carried away with the spray water out through the open drain 84. The gases exhausting through the common outlet 50 pass through the conduit 54, as shown in FIG. 1, to the flooded disc scrubber 56 for separation of most of the remaining particles, then to the mist eliminator 58 and then out the chimney 14 under the draft of the fan 16.

When the cupola 20 is to be shut down and the cupola 22 is to be operated as illustrated in FIG. 6, the body 88 of water is drained from the quencher section 32b by opening the drain 86. Drain 84 is closed and similar water body 88a is built up in the quencher section 32a, as shown in FIG. 6, so as to seal off the non-functioning cupola 20. The hot dirty gases from the functioning cupola 22 then flow into and through the quencher section 32b and are acted thereon in such section in the same way as described above with regard to the hot dirty gases flowing through the quencher section 32a. As can be appreciated from FIGS. 1, 2 and 7, the dirty gas stream S' enters the section 32b and, after being quenched and scrubbed, exits through the common outlet 50 and then follows the same route through the scrubber system 10 to the chimney 14.

The preferred form of the recirculation system is shown in FIG. 7. Water drained from valve controlled drains 84, 86 located in the bottom of the quencher 32, is carried by conduit 90 to a settling or separation tank 92 where the heavier particulate matter falls to the bottom, is progressively drained away through drain 94 and disposed of. A float-valve 96 monitors the level of the water in tank 92 permitting introduction of additional water when required. Water for recirculation is drawn off through conduit 98 and is returned to the headers 99 on top of the quencher 32 by pump 102 and conduit 103. Water is also recirculated to the flooded disc scrubber 56 by conduit 110 and pump 100 while the scrubber water is returned to the settling tank 92 through conduit 112 from the mist-eliminator 58. If necessary, the chemical nature of the water may be continuously monitored and chemicals added to maintain the pH at the desired level.

The apparatus of this invention will collect about 50 percent of the particulate matter moving in the gas stream of about 60 f.p.s. and lower the temperature of the gas from 1,400°F to a range of 200°F to 400°F. as the gas leaves the outlet opening. The performance of the quencher connected with the flooded disc scrubber system is increased to remove about 95 to 99 percent of the total particulate matter in the gas stream.

While the preferred form of the apparatus of this invention has been described herein, it should be understood that modifications can be made in the form shown without departing from the invention as defined in the claims.

I claim:

1. A quencher-scrubber for at least two separate sources of hot particle-laden gas comprising a vertically oriented hollow cylindrical body having a top wall and a floor, at least two inlets provided therein above the floor, one for each source of hot dirty gas, and a common outlet, a dividing baffle upstanding from the floor and dividing the body into two sections, one for each inlet, said dividing baffle being normal to the outlet and having an upper end terminating above the lower level thereof, a baffle in each section depending from the top wall and having a lower end extending below the top of the dividing baffle and spaced above the floor to define therewith a flow passage for gases entering the inlet for the section, each of said sections having a controlled drain provided in the floor on opposite sides of the dividing baffle and means for washing the baffles and the gas streams with spray liquid in each of said sections, said last means, when the drain of one section is closed off and the associated gas source is in a non-functioning condition; building up a body of water in said one section to a level above the lower end of the baffle therein and below the upper end of the dividing baffle so as to provide a water seal in said one section for sealing off the inlet therein and said last means operating with the drain of the other section open and such section being in operation with its gas source so that the gases entering the inlet of the other section are quenched by the water spray and particles are separated out therefrom to flow with the spray water out through the open drain.

2. The invention of claim 1, wherein said last means including overhead water spray nozzles depending from the top of the quencher.

3. The invention of claim 1 wherein said floor is conical and the dividing baffle is diametrically disposed in the quencher at the center apex of the floor and the drains are provided in the apex of the floor for each section on opposite sides of the dividing baffle.

4. The invention of claim 1 wherein said quencher is cylindrical in horizontal cross-section and the inlets are formed therein in angularly spaced apart relation.

5. A quencher-scrubber apparatus for at least two sources of hot, particle-laden gas, the apparatus comprising:
   wall means including a top wall, side walls and a generally conical bottom defining a closed container having at least two spaced-apart inlet openings and an outlet opening all located in the upper portion of said side walls of the container; a pair of valve control drains at the lower end of said conical bottom;
   first and second conduits connecting each of the inlet openings to a source of hot, particle-laden gas; a third conduit connected to the outlet opening;
   a pair of ceiling baffles located within the container extending across the side walls between each inlet opening and the outlet opening, said baffles extending downwardly from the top wall to a point adjacent said bottom of the container and below the lower edge of the outlet opening to therein block direct flow of gas between the inlet openings and the outlet opening;

a bottom baffle within the container extending across the side walls from a point intermediate the two inlet openings to the proximity of the outlet opening to generally divide the container into first and second treatment sections, said baffle extending upwardly from said bottom of the container between the said pair of drains to a point adjacent the lower edge of the outlet opening and above the lower edges of the ceiling baffles;

a plurality of spray nozzles within said treatment sections within the container to direct liquid under pressure into the gas streams as the gas flows from the inlet openings, under the said pair of ceiling baffles, then over the said bottom baffle and out the outlet opening, said liquid containing a portion of the particle matter formerly in the air stream passing out the drains, whereby when the flow of gas between one inlet opening and the outlet opening is cut off, the drain for that treatment section is closed causing water from the spray nozzles to accumulate above the bottom edge of the ceiling baffle before flowing out the outlet opening thereby sealing the said treatment section.

6. The invention of claim 5 wherein said quencher is cylindrical in horizontal cross-section and the inlets are formed therein in angularly spaced apart relation.

7. A hot gas quenching-scrubbing system for use with at least two foundry furnace cupolas or the like several sources of hot particle-laden gases comprising a vertically oriented gas quencher-scrubber that is positioned intermediate and in proximity to the two cupolas, said quencher-scrubber having inlets for hot gases discharged from the cupolas, ducts connecting the cupolas to the inlets of the quencher-scrubber, said quencher-scrubber having an outlet common to the two inlets, conduit means connected to the outlet, at least a mist eliminator connected in series in the conduit means, an exhaust means, a fan means associated with the exhaust means for creating a draft to move the gas stream through the quencher-scrubber and on through the conduit means to the exhaust means, said quencher-scrubber having a floor, a dividing baffle upstanding from the floor and dividing the quencher-scrubber into two internal sections, one for each of said inlets and their associated cupola, said quencher-scrubber having a top wall, a baffle for each section depending from the top wall and disposed vertically in each section in confronting relation with the inlet therefor and beneath which the gas stream flowing through each section from the associated inlet passes, said dividing baffle having an upper end terminating above the level of the outlet, said baffles in the quencher section having lower ends terminating below the upper end of the dividing baffle and spaced from the floor, each of said sections having a controlled drain provided in the floor, and means in the quencher-scrubber sections for washing the baffles and the gas streams with quenching spray water, said last means, when the drain of one section is closed off and the cupola associated with said section is in a non-functioning condition, building up a body of water in said one section to a level above the lower end of the baffle therein and below the upper end of the dividing baffle so as to provide a water seal in said section for the non-functioning cupola and said last means operating with the drain of the other section open and such section and its cupola being in operation to quench the gas stream entering said section and to separate out particles from the gas stream before said stream passes through the outlet and through the conduit means to the exhaust means.

* * * * *